April 9, 1957 F. WOHLMAN, JR 2,788,431

WELDING APPARATUS FOR SEMICONDUCTOR TRANSLATING DEVICE

Filed June 22, 1955 3 Sheets-Sheet 1

INVENTOR,

FRED WOHLMAN, JR.

BY Henry Heyman

ATTORNEY

April 9, 1957 F. WOHLMAN, JR 2,788,431

WELDING APPARATUS FOR SEMICONDUCTOR TRANSLATING DEVICE

Filed June 22, 1955 3 Sheets-Sheet 2

INVENTOR,

FRED WOHLMAN, JR.

BY Henry Heyman

ATTORNEY

WELDING APPARATUS FOR SEMICONDUCTOR TRANSLATING DEVICE

Filed June 22, 1955

INVENTOR,
FRED WOHLMAN, JR.

BY Henry Heyman
ATTORNEY 2,788,431

WELDING APPARATUS FOR SEMICONDUCTOR TRANSLATING DEVICE

Fred Wohlman, Jr., Inglewood, Calif., assignor to Hughes Aircraft Company, Culver City, Calif., a corporation of Delaware Application June 22, 1955, Serial No. 517,329
6 Claims. (Cl. 219—78)

The present invention relates generally to a welding apparatus and relates more specifically to a welding apparatus for components of semiconductor translating devices.

In the manufacture of semiconductor translating devices such as, for example, transistors, diodes, rectifiers, photocell devices and the like, it is important that such devices be constructed in a precise manner. Considerable difficulty is presented in such precise construction due to the extremely small sizes of these translating devices, necessitating the use of highly refined and improved manufacturing techniques which may also be suitable for integration with other mass production techniques.

In most semiconductor translating devices, it is necessary that at least one relatively small wire or "whisker" be employed as a conductor in conjunction with a semiconductor crystal or the like. The whisker so utilized is generally in the nature of .001" to .005" in diameter and in the nature of ⅛" long. This wire whisker must be permanently secured to another portion of the composite conductor element, or lead of the device, in a precise manner and in an extremely precise location, such location being generally on a flat axial end of the lead.

Accordingly, it has been necessary to provide an apparatus for securing, as by welding, a whisker to another element of a semiconductor translating device component such as a lead thereof, it being one important object of this invention to provide such an apparatus.

It is another important object of the present invention to provide a welding apparatus for components of semiconductor translating devices wherein means are provided for supporting and aligning various elements of the components.

It is a further important object of this invention to provide a welding apparatus for semiconductor translating devices that is simple and rugged in construction, accurate and reliable in use and efficient and effective in operational characteristics.

Still another important object of the present invention is to provide a novel welding apparatus for semiconductor translating devices wherein novel means are employed for insuring effective electrical contact between elements of the translating device components and a source of spot welding current.

A still further object of the present invention is to provide a novel welding apparatus for components of semiconductor translating devices including novel means for supporting, aligning and guiding a spot welding head relative to the desired point of contact thereof with portions of elements utilized in such components.

Other and further important objects of the present invention will become apparent from the disclosures in the following detailed specification, appended claims and accompanying drawings, wherein:

Figure 1:
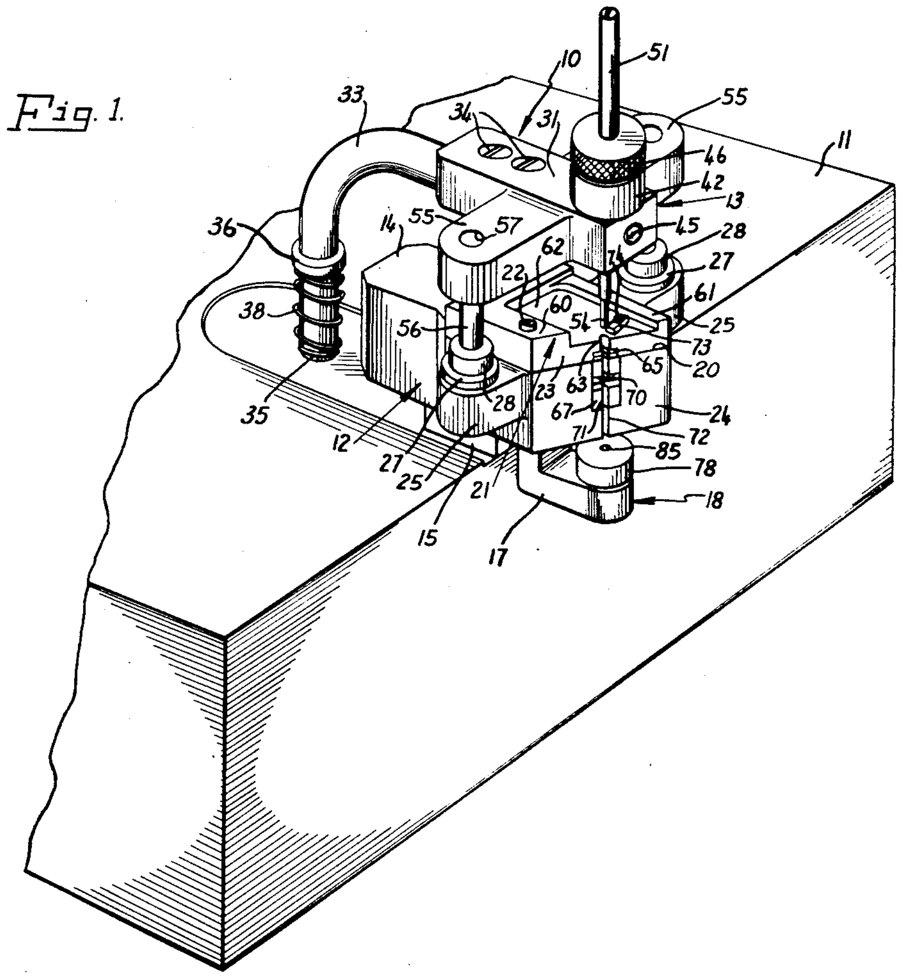
Figure 1 is a perspective view showing the present welding apparatus for components of seimconductor translating devices.

With reference to the drawings, wherein like reference characters denote like parts, the welding apparatus of the present invention is shown as indicated generally at 10. The device 10 is designed to rest on and be mounted to a suitable support or box arrangement 11 that may be of any suitable type and which may be designed to enclose suitable electrical mechanism utilized in the operation of the present welding apparatus. The apparatus 10 includes a base structure indicated generally at 12 and a head structure indicated generally at 13.

Figures 2, 3:
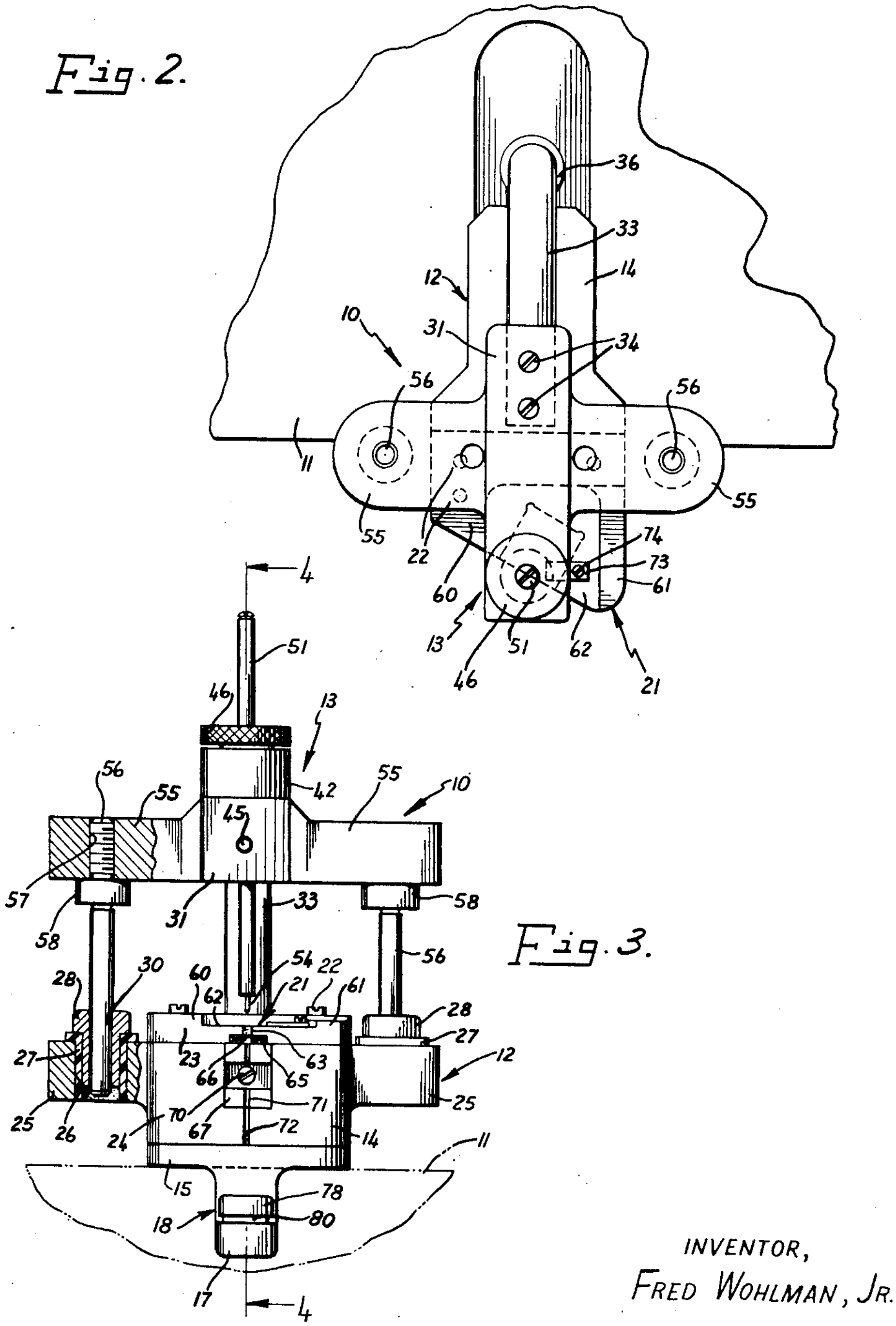
Fig. 2 is a top plan view of the present apparatus.
Fig. 3 is a front elevational view thereof with portions in section.
Figure 4:
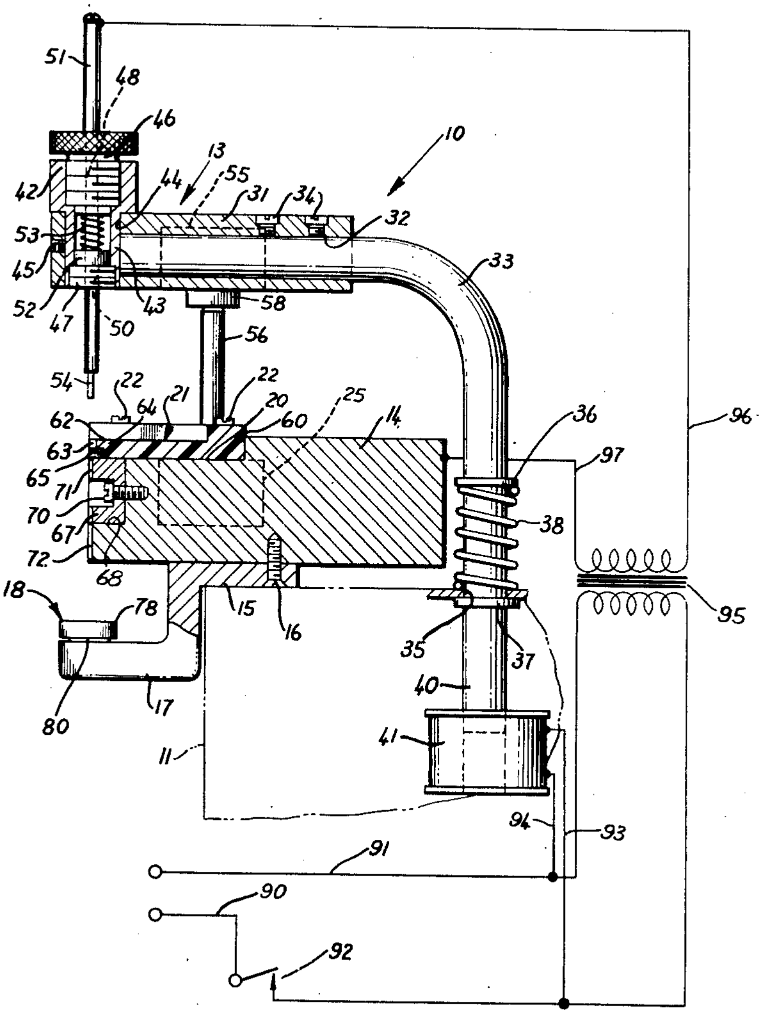
Fig. 4 is a sectional view taken substantially as indicated by line 4—4, Fig. 3.

As shown primarily in Figs. 1 and 4, the base structure 12 includes a block base body 14 that is mounted on a support member 15 and secured thereto as by screws 16. The support member 15 has a downwardly and forwardly extending foot 17 which also serves to carry a contact arrangement indicated generally at 18, this arrangement to be hereinafter more fully described. The block body 14 has a forwardly and upwardly directed stepped surface 20 on which is disposed a platform 21 of suitable dielectric material. The platform 21 is secured to the block body as by a plurality of screws 22 and has an angularly disposed forward face 23 which is disposed in coextensive planar alignment with a similar angularly disposed face 24 on the block body 14. The body 14 is further provided with laterally extending guide supporting portions 25 with each of these portions 25, as shown in Fig. 3, having vertical bores 26 therein. The bores 26 are adapted for reception of dielectric sleeves 27 that are flanged on the upper ends thereof. The sleeves 27 are further adapted for the reception of bearing members 28 which are also flanged for engagement with the flanges on the sleeves. The bearing members 28 are each provided with vertically extending bores 30 therethrough.

The head structure 13, as shown primarily in Figs. 1, 3 and 4, includes a head body 31 having a longitudinal cylindrical bore 32 therein. A support rod 33 is adapted for disposition in the bore 32 and for retention therein by means of screws 34. The rod 33 is cruved downwardly and extends through an opening 35 in the cover of the supporting box or container 11. The rod 33 is further provided with a pair of flanges 36 and 37, these flanges being spaced apart and arranged on each side of the cover portion in which the opening 35 is formed, with the flange 37 bearing against a lower face of this cover portion. A compression spring 38 is disposed between the cover and the flange 36 whereby to bias the rod 33, together with the head structure 11, in an upwardly direction. A lower end 40 of the rod 33 serves as an armature and is cooperatively arranged with respect to a solenoid 41, whereby upon energization of this solenoid to move the rod 33 and portion 40 thereof in a downwardly direction whereby also to move the head structure 13 in a similar direction. Upon deenergization of the solenoid 41, the compression spring 38 will again return the apparatus to the upper position as shown in the drawings.

The head structure 13 further includes a collar 42, the lower end of which is reduced in diameter as at 43 and disposed in a vertical bore 44 formed through an outer end of the head body 31. The collar 42 is retained in position by means of a set screw 45 which threadably engages the body 31. A knurled screw 46 is threadably disposed in an upper end of the collar 42, while a set screw 47 is threadably disposed in the lower end thereof. A pair of aligned bores 48 and 50 are provided through the screws 46 and 47 respectively, an elongated welding head 51 being slidably disposed in these bores. The welding head structure 13 serves as a carriage for the welding head 51 that is resiliently mounted in a vertical direction with respect to the body 31. This resilient mounting is provided by means of a flange 52 formed on the head 51 and disposed normally adjacent an inner end of the set screw 47. A compression spring 53 is disposed within the collar 42 intermediate the flange 52 and an inner end of the knurled screw 46 whereby to bias the welding head in a downward direction. The welding head is further provided, on the lower end thereof, with a reduced diameter welding tip 54.

The head body 13 is provided with laterally extending guide support portions 55, Figs. 1 and 3, there being a pair of guide pins 56 which threadably engage in vertical openings 57 in the portions 55. The guide pins 56 are provided with intermediate flanges 58 and are adapted for engagement with lower surfaces of the portion 55. The lower ends of the guide pins 56 are adapted for slidable disposition in the bores 30 in the bearing members 28, whereby to guide and align the head structure 13 with respect to the base structure 12.

Figure 6:
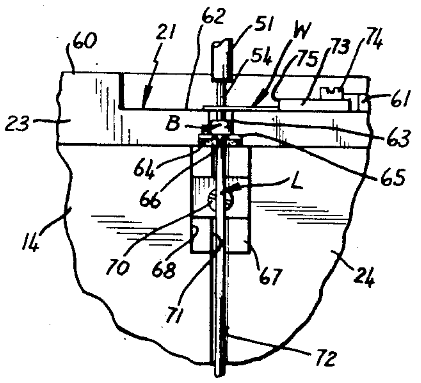
Fig. 6 is an enlarged fragmentary sectional view showing the detailed manner of supporting, aligning and welding the elements of the semiconductor translating device component subassembly by means of the apparatus of the present invention.

With reference primarily to Figs. 1, 2 and 3, the platform 21 further includes a raised peripheral portion 60 which extends about two sides of the platform, and a third raised portion 61, of less height, which extends along another peripheral edge of the platform. Thus, the platform 21 has a planar surface 62 that is defined on three sides by the raised portions 60 and 61 with the side edge thereof adjacent the angularly disposed surface 23 being open. With reference to Fig. 6, the platform 21 is further provided with a semicircular cutout 63 in the angularly disposed surface 23 and extending into the surface 62 thereof. The cutout 63 extends a portion of the distance through the thickness of the platform 21, there being an enlarged semicircular cutout 64 in the lower surface thereof also leading inwardly from the surface 23. A semicircular wear resisting metallic disc 65 is adapted for disposition in the upper end of the larger cutout 64 and is retained therein as by cementing or the like. The disc 65 is provided with a semicircular cutout 66 in the central area thereof, this cutout being somewhat smaller in diameter than the cutout 63 in the platform 21. Thus, an element of a component subassembly of a semiconductor translating device, comprising a lead L and a bead B fused thereto adjacent one end thereof, may be supported within the cutouts 63, 64 and 66 with the lower surface of the bead B resting upon an upper surface of the disc 65. An upper end of the lead L is disposed in coextensive alignment with the surface 62 of the platform 21 for a purpose to be hereinafter more fully described.

In order to support and retain the lead and bead subassembly with respect to the cutouts 63, 64 and 66, a permanent magnet 67 is disposed in a rectangular recess 68 in the face 24 of the base body portion 14. The faces of the magnet 67 are arranged in coplanar relationship with respect to the surface 24 of the base body 14 with the magnet being retained in position by means of a screw 70. The faces of the magnet 67 are provided with V-shaped vertically extending aligned grooves 71 while the surface 24 of the base body 14 is also provided with a like V-shaped groove 72, with the lead L of the semiconductor lead-bead combination being adapted for disposition in the grooves 71 and 72.

In order properly to align a whisker, indicated at W in Fig. 6, with the upper end of the lead L, a stop member 73 is positioned on the surface 62 of the platform 21 and retained thereon by means of a screw 74. An end 75 of the stop member 73 serves as a stop for one end of the whisker W, whereby accurately to predetermine the desired distance for one end of the whisker to a center line of the lead L. This particular distance relationship is extremely important in the manufacture of semiconductor translating devices, inasmuch as further work on the whisker W is generally thereafter performed as for example by bending, kinking or otherwise forming the whisker to the desired configuration for use with other components of the devices.

Figure 5:
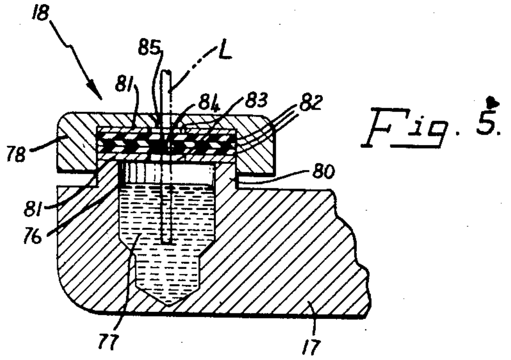
Fig. 5 is an enlarged fragmentary sectional view of the electrical contact arrangement for one element of the semiconductor translating device.

With reference now primarily to Fig. 5, the electrical contact structure 18 for one end of the lead L comprises an upwardly directed recess 76, in an outer end of the foot 17, with this recess being partially filled with a metallic conductive liquid such as mercury or the like indicated at 77. A cap 78 is disposed about an annular neck 80 formed upwardly from the foot 17, there being a pair of metallic discs 81 disposed respectively within an upper portion of the cap and adjacent an upper surface of the neck 80. A plurality of resilient wiper members 82 are disposed between the discs 81. The discs 81 are provided with enlarged centrally disposed openings 83 while the wiper members are provided with reduced diameter central openings 84 which are adapted closely to confine the lead L. The upper portion of the cap 78 is further provided with an opening 85 having a conical upwardly directed portion, the openings 83, 84 and 85 being in axial vertical alignment with each other. Accordingly, the lead L, of the semiconductor translating device subassembly component element, is adapted for insertion through the openings 83, 84 and 85 and immersion in the mercury 77, whereby to insure positive electrical contact thereof with the base body 14 through the foot 17 and the support structure 15. When the lead L is withdrawn from the openings 83, 84 and 85, the wiper members serve to remove any mercury that may undesirably adhere to the lead.

With reference now primarily to Fig. 4, it is to be noted that a pair of leads 90 and 91 are connected to a suitable source of electrical energy, there being a switch 92 in one of the leads 90. A second pair of leads 93 and 94 are connected to the leads 90 and 91 respectively and extend to the solenoid 41. The leads 90 and 91 extend further to the primary weldings of a transformer 95, there being leads 96 and 97 extending from the secondary winding, of the transformer 95, respectively to the welding head 51 and the base body 14.

In practice, it is common for the switch 92 to be in the form of a foot switch. An operator of the present device usually places a quantity of prepared whiskers, cut to the desired length, upon the surface 62 of the platform 12 and within the confines of the raised portions 60 and 61 thereof. A lead L, having a bead B fused thereon, is disposed in position in the cutout 63, 64 and 66, in the grooves 71 and 72 and within the openings 83, 84 and 85. A whisker is thereafter positioned, usually by means of a pair of forceps, in alignment over the upper end of the lead L and against the face 75 of the stop member 73. Thereafter the switch 92 is closed, whereby to energize the solenoid 41 and to move the head structure 13 in a downwardly direction in the manner described hereinbefore, thus to effect contact between the lower end of the welding tip 54 and the whisker W. A pulse of electrical energy is then transmitted laterally through the whisker W, with the circuit being completed through the lead L, whereby to spot weld the whisker W to the end of the lead L. The pressure of the welding tip 54 upon the whisker W is limited by the force of the compression spring 53, which serves to permit upward slidable movement of the welding head 51 with respect to the head structure or carriage 13.

Thus, the whisker W is positively secured to the end of the lead L in a precise and accurate manner and commensurate with necessities in mass production techniques. Upon opening of the switch 92, the compression spring 38 serves to return the head structure or carriage 13 to its original position, with the lead L, together with its newly affixed whisker W, being removed manually from the supporting position thereof by gripping of the lead within the space defined between the faces of the permanent magnet 67. In most instances, due to the relatively small sizes of these components, it is necessary that this entire operation be carried out with the aid of a microscope. However, it may be seen that accurate positioning and determination of the length of the whisker W is taken care of by provision of the various components of the present apparatus arranged in a particular manner.

Having thus described the invention and the present embodiments thereof, it is desired to emphasize the fact that many modifications may be resorted to in a manner limited only by a just interpretation of the following claims.

What is claimed is:

1. A welding device for components of semiconductor translating devices comprising, in combination: a base; a supporting head disposed above said base; means for movably supporting said supporting head relative to said base; a welding head; means for resiliently and vertically positioning said welding head in said supporting head; a pair of guide pins carried by said supporting head; bearing means carried by said base, said guide pins being adapted for slidable reception in said bearing means; magnetic means for supporting one element of said devices on said base and in axial alignment with said welding head; platform means carried by said base for aligning another element of said devices with said one element; a container supported on said base in axial alignment with said supporting magnetic means and said welding head; a quantity of mercury in said container, said one element of said devices being adapted for disposition in said mercury whereby to effect electrical contact between said one element and a source of electric current, said current also being connected with said welding head; and means for moving said supporting and welding heads toward said platform, said base and said elements, whereby to contact said another element and to apply a welding pulse for securing said another element to said one element.

2. A welding device for components of semiconductor translating devices comprising, in combination: a base; a supporting head disposed above said base; means for movably supporting said supporting head relative to said base; a welding head; means for resiliently and vertically positioning said welding head in said supporting head; a pair of guide pins carried by said supportng head; bearing means carried by said base, said guide pins being adapted for slidable reception in said bearing means; magnetic means for supporting one element of said devices on said base and in axial alignment with said welding head; platform means carried by said base for aligning another element of said devices with said one element; a container supported on said base in axial alignment with said supporting magnetic means and said welding head; a quantity of mercury in said container, said one element of said devices being adapted for disposition in said mercury whereby to effect electrical contact between said one element and a source of electric current, said current also being connected with said welding head; means for moving said supporting and welding heads toward said platform, said base and said elements, whereby to contact said another element and to apply a welding pulse for securing said another element to said one element; and wiper means carried by said container for removing undesirable mercury from said one element as said one element is removed from said container.

3. A welding device for components of semiconductor translating devices comprising, in combination: a base; a supporting head disposed above said base; means for movably supporting said supporting head relative to said base; a welding head; means for resiliently and vertically positioning said welding head in said supporting head; a pair of guide pins carried by said supporting head; bearing means carried by said base, said guide pins being adapted for slidable reception in said bearing means; magnetic means for supporting one element of said devices on said base and in axial alignment with said welding head; platform means carried by said base for aligning another element of said devices with said one element; recess means in said platform for receiving said one element of said devices; stop means also carried by said platform for positioning one end of said another element a predetermined distance from one end of said one element; a container supported on said base in axial alignment with said supporting magnetic means and said welding head; a quantity of mercury in said container, said one element of said devices being adapted for disposition in said mercury whereby to effect electrical contact between said one element and a source of electric current, said current also being connected with said welding head; and means for moving said supporting and welding heads toward said platform, said base and said elements, whereby to contact said another element and to apply a welding pulse for securing said another element to said one element.

4. A welding device for components of semiconductor translating devices comprising, in combination; a base; a supporting head disposed above said base; means for movably supporting said supporting head relative to said base; a welding head; means for resiliently and vertically positioning said welding head in said supporting head; a pair of guide pins carried by said supporting head; bearing means carried by said base, said guide pins being adapted for slidable reception in said bearing means; magnetic means for supporting one element of said devices on said base and in axial alignment with said welding head; platform means carried by said base for aligning another element of said devices with said one element; recess means in said platform for receiving said one element of said devices; stop means also carried by said platform for positioning one end of said another element a predetermined distance from one end of said one element; a container supported on said base in axial alignment with said supporting magnetic means and said welding head; a quantity of mercury in said container, said one element of said devices being adapted for disposition in said mercury whereby to effect electrical contact between said one element and a source of electric current, said current also being connected with said welding head; means for moving said supporting and welding heads toward said platform, said base and said elements, whereby to contact said another element and to apply a welding pulse for securing said another element to said one element; and wiper means carried by said container for removing undesirable mercury from said one element as said one element is removed from said container.

5. A welding device for components of semiconductor translating devices comprising, in combination: a base; a supporting head disposed above said base; means for movably supporting said supporting head above and relative to said base; a welding head having a reduced diameter welding tip thereon; means for resiliently and vertically positioning said welding head in said supporting head; means for adjusting the vertical position of said head; a pair of guide pins carried by said supporting head; insulated bearing means carried by said base, said guide pins being adapted for slidable reception in said bearing means; magnetic means having aligned grooves for supporting one element of said devices on said base and in axial alignment with said welding head; dielectric platform means carried by said base for aligning another element of said devices with said one element; a container supported on said base in axial alignment with said supporting magnetic means and said welding head; a cap for said container; a quantity of mercury in said container, said one element of said devices being adapted for disposition in said mercury whereby to effect electrical contact between said one element and a source of electric current, said current also being connected with said welding head; electrically operated means for moving said supporting and welding heads toward said platform, said base and said elements, whereby to contact said another element and to apply a welding pulse for securing said another element to said one element; and wiper means carried by said cap of said container for removing undesirable mercury from said one element as said one element is removed from said container.

6. A welding device for components of semiconductor translating devices comprising, in combination: a base, a supporting head disposed above said base; means for movably supporting said supporting head above and relative to said base; a welding head having a reduced diameter welding tip thereon; means for resiliently and vertically positioning said welding head in said supporting head; means for adjusting the vertical position of said head; a pair of guide pins carried by said supporting head; insulated bearing means carried by said base, said guide pins being adapted for slidable reception in said bearing means; magnetic means having aligned grooves for supporting one element of said devices on said base and in axial alignment with said welding head; dielectric platform means carried by said base for aligning another element of said devices with said one element; recess means in said platform for receiving said one element of said devices; stop means also carried by said platform for positioning one end of said another element a predetermined distance from one end of said one element; a container supported on said base in axial alignment with said supporting magnetic means and said welding head; a cap for said container; a quantity of mercury in said container, said one element of said devices being adapted for disposition in said mercury whereby to effect electrical contact between said one element and a source of electric current, said current also being connected with said welding head; electrically operated means for moving said supporting and welding heads toward said platform, said base and said elements, whereby to contact said another element and to apply a welding pulse for securing said another element to said one element; and wiper means carried by said cap of said container for removing undesirable mercury from said one element as said one element is removed from said container.

References Cited in the file of this patent

UNITED STATES PATENTS

| | | |
|---|---|---|
| 1,327,792 | Thornton | Jan. 13, 1920 |
| 1,673,500 | Dwyer | June 12, 1928 |
| 2,474,340 | Warner | June, 28, 1949 |

FOREIGN PATENTS

| | | |
|---|---|---|
| 136,720 | Great Britain | Dec. 24, 1919 |
| 346,957 | Germany | Jan. 20, 1922 |